United States Patent [19]

Gallorini et al.

[11] Patent Number: 5,552,841
[45] Date of Patent: Sep. 3, 1996

[54] LIQUID CRYSTAL EYEGLASSES

[75] Inventors: Massimo Gallorini, Arezzo; Bruno Angilella, Civitella della Chiano; Sandro Bocci, Arezzo, all of Italy

[73] Assignee: A B G S.r.l., Arezzo, Italy

[21] Appl. No.: 317,920

[22] Filed: Oct. 4, 1994

[30] Foreign Application Priority Data

Oct. 6, 1993 [IT] Italy .................................. FI93A196

[51] Int. Cl.$^6$ .................................................. G02C 7/12
[52] U.S. Cl. .................................. 351/49; 351/44; 351/45
[58] Field of Search .............................. 351/44, 49, 45, 351/158, 41; 359/36, 38, 39, 40

[56] References Cited

U.S. PATENT DOCUMENTS

| | | | |
|---|---|---|---|
| 4,279,474 | 7/1981 | Belgorod | 351/44 |
| 5,276,539 | 1/1994 | Humphrey | 351/44 |

Primary Examiner—William L. Sikes
Assistant Examiner—Hung Xuan Dang
Attorney, Agent, or Firm—McGlew and Tuttle, P.C.

[57] ABSTRACT

The optical instrument comprises at least one lens (5) and application means (9) for applying the optical device. The lens is constituted at least in part by a liquid crystal device (LCD); power supply means of regulable voltage (11) are provided, to control the transparency of the lens.

15 Claims, 3 Drawing Sheets

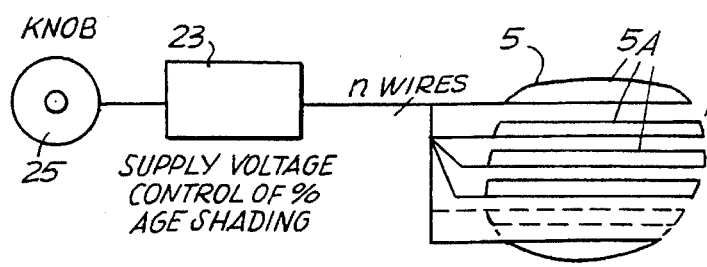
Fig. 5
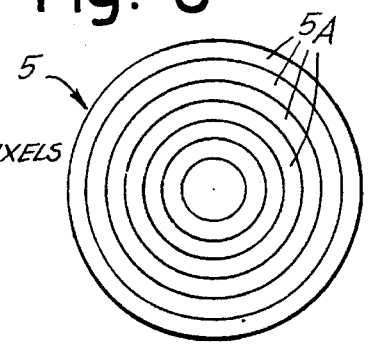
Fig. 6
Fig. 7
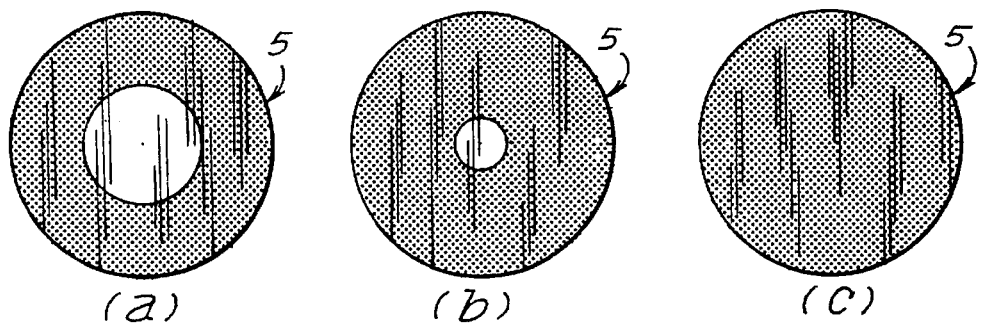
Fig. 8
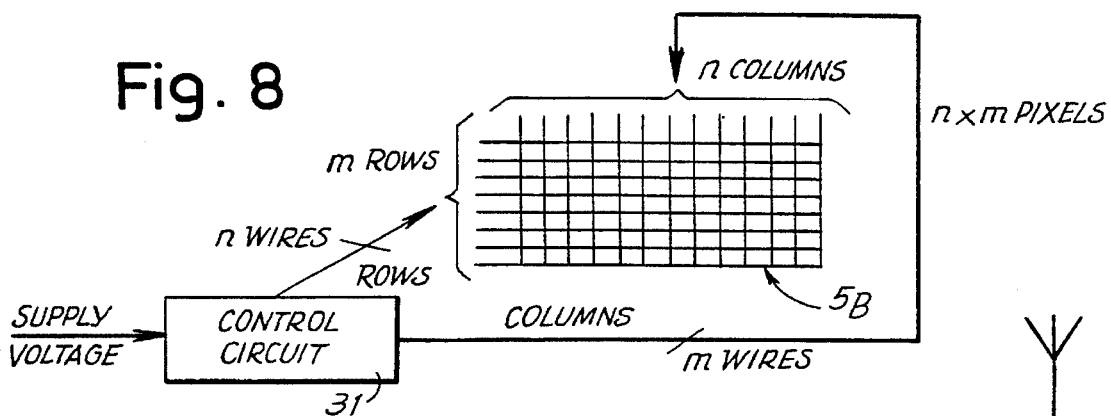
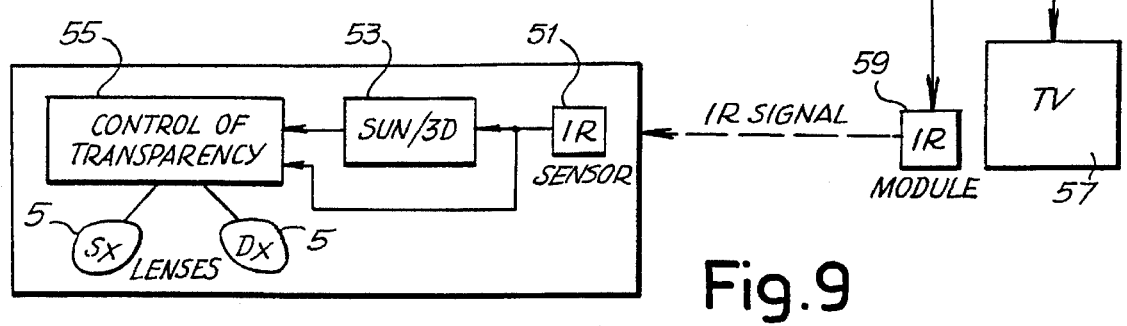
Fig. 9

LIQUID CRYSTAL EYEGLASSES

FIELD OF THE INVENTION

The invention relates to a novel type of optical instrument, which can be realized in the form of spectacles or in the form of a monocle, of an eyepiece or otherwise, in which means are provided for varying the transparency of the optical system, for various purposes.

BACKGROUND OF THE INVENTION

There are currently in existence spectacles of photochromic type, in which the lenses are constructed in materials which vary their own transparency as a function of the intensity of the irradiation received. This permits the user to have a lens which has a greater or lesser screening effect, depending upon the external conditions. Spectacles of this type exhibit the disadvantage that the chromatic variation of the materials used is rather slow and thus a great length of time is necessary for the adaptation of the lens to the external irradiation conditions. This disadvantage has placed considerable limitations on the widespread use of this type of spectacles, which are used only in a few applications, for example in the field of sports, where it is possible to find skiing goggles of photochromic type.

SUMMARY AND OBJECTS OF THE INVENTION

The object of the present invention is the realization of an optical instrument, in particular a pair of spectacles, which does not exhibit the restrictions of conventional photochromic spectacles, and which in particular permits a rapid, possibly automatic, adaptation to the variation of the external radiation conditions or to other practical requirements.

In substance, the optical instrument according to the present invention includes at least one lens comprising at least one liquid crystal device controlled by means of a voltage generated by controlled voltage generating means, for example incorporating a solar cell or the like, which (in a preferred embodiment) produce a control voltage proportional to the irradiation received. The use of a liquid crystal lens involves the significant advantage that the variation of the transparency of said lens is immediate, as a function of the variation of the control voltage. By placing the solar cell (or other equivalent photosensitive means, such as a photoresistor) in an expedient position, for example between the two lenses of a pair of spectacles, the luminous intensity received by the solar cell is instantaneously translated into a control signal which promptly varies the transparency of the lens. This permits, for example, the realization of sunglasses which are particularly useful for driving, for it is known that sunglasses drastically reduce the visibility in a tunnel when a transition takes place from conditions of maximum irradiation to conditions of minimum irradiation. The disadvantage is made more accentuated by the low level of illumination in the tunnel and by the time required for the eye to become adapted to the varied illumination conditions. The adoption of a liquid crystal system with control by means of solar cells or other equivalent means entirely eliminates this disadvantage, as the transparency of the lenses is instantaneously adapted to the variation of external luminosity conditions, as a result of which, while traveling out of the tunnel the lens assumes a suitable screening characteristic to protect the eye, and as soon as the driver enters a tunnel the lens becomes fully transparent as a result of the lack of irradiation on the solar cell or similar device, compensating, inter alia, for the slowness of adaptation of the eye to the external illumination conditions.

The optical instrument according to the invention lends itself to various applications, and its use is not limited to the realization of spectacles. For example, it is possible to realize monocles or other special eyepieces based on the same principle. In a similar way, it is possible to realize filters for photographic, cinematographic and other apparatuses. A particularly beneficial use may be envisioned in photography, in combination with objective lenses having no diaphragm, for which it is frequently necessary to use gray filters of differing intensity. The use of a filter realized with a liquid crystal device with means for controlling the screening power thereof eliminates the necessity to have available a large number of filters of various shades. In this case, manual regulation of the transparency may be preferable.

While in the simplest basic configuration the lens or each lens is constituted by a single liquid crystal device, which thus changes its own transparency in a uniform manner over the entire area of the lens or of the filter, in an improved embodiment of the present invention it is suggested to subdivide the lens (or each lens, in the case of spectacles) into a plurality of expediently arranged fields, each one of which is realized with an independent liquid crystal device. Each field thus constitutes a pixel which can be controlled by a voltage of its own. It is thus possible to realize for example a lens subdivided into strips of horizontal, substantially rectilinear extent powered by a control voltage regulated in such a manner that the lens assumes a form shaded with less transparency in the upper zone and greater transparency in the lower zone. This can readily be obtained, for example, by connecting the individual strips in series, with the interposition of resistive elements. In a further improvement, it is possible to provide manual regulation of the amount of this shading by varying, for example, the resistance between pixel and pixel.

Instead of rectilinear pixels of horizontal extent, it is also possible to use fields or pixels of annular form in order to realize a lens which behaves as a diaphragm or shutter. A device of this type can be useful for example in the photographic or cine field. The regulation, which can be based on the voltage generated by solar cells which are sensitive to the irradiation, or controlled by other devices, can be realized in such a manner that each field or pixel can assume either a condition of maximum transparency or of darkness. This leads to the achievement of the same behavior as that of a mechanical diaphragm.

Although an automatic control of the transparency of the lens as a function of the external irradiation may in many cases be preferable and advantageous, the possibility is not ruled out that the adaptation of the transparency of the lens can take place manually, by acting for example on a potentiometer to vary the degree of transparency of the lens by means of variation of the supply voltage of the LCD device.

The invention will be better understood on following the description and the accompanying drawing, which shows a practical nonlimiting illustrative embodiment of said invention. In the drawing:

FIG. 5 shows a diagram of the electronic control system of a lens of the type shown in FIGS. 3 and 4;

FIG. 6 shows a lens subdivided into a plurality of annular pixels or fields;

Figure 10:
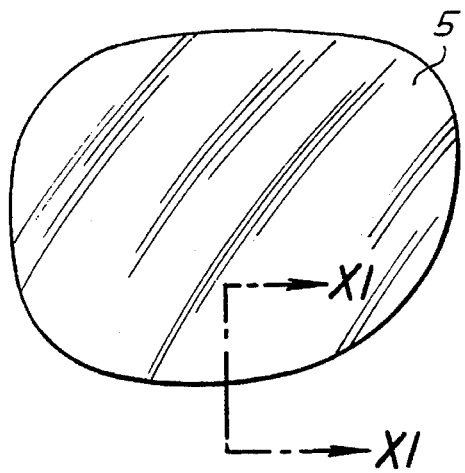
Figure 11:
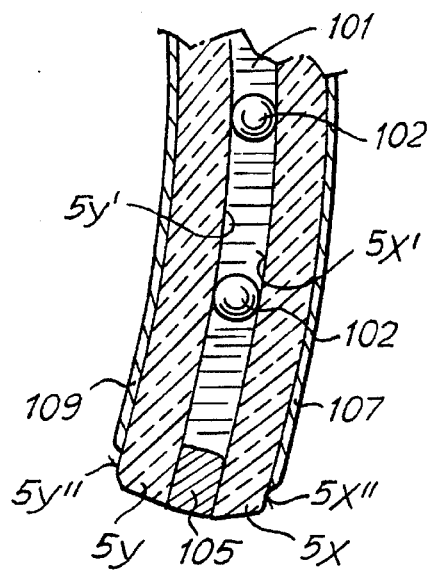
Figure 12:
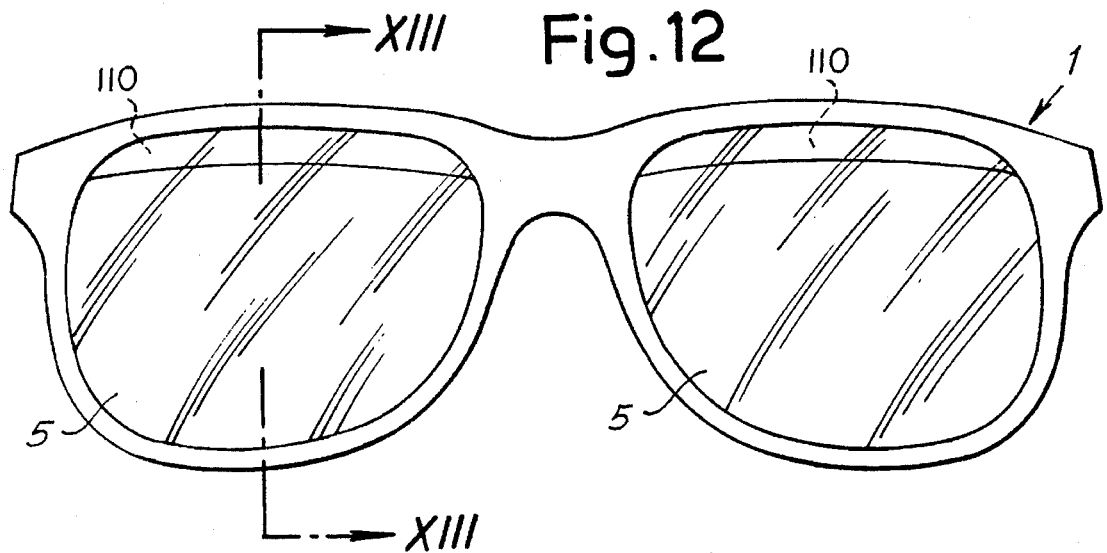
Figure 13:
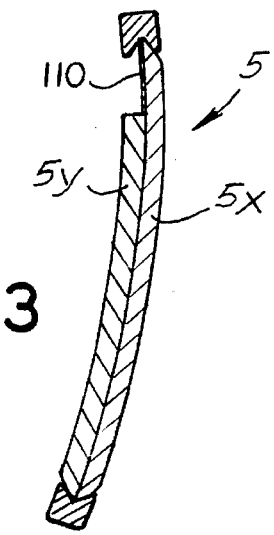

FIGS. 7a, b and c show the behavior of a lens realized according to the diagram of FIG. 6;

FIG. 8 shows a diagram of the lens subdivided into a matrix of pixels;

FIG. 9 shows a diagram of a lens equipped with an auxiliary device to permit the decoding of the television images intended for three dimensional transmission systems;

FIGS. 10 and 11 show a further embodiment of the device in the form of a pair of spectacles; and FIGS. 12 and 13 show a further embodiment of the device in the form of a pair of spectacles.

DESCRIPTION OF THE PREFERRED EMBODIMENT

Figure 1:
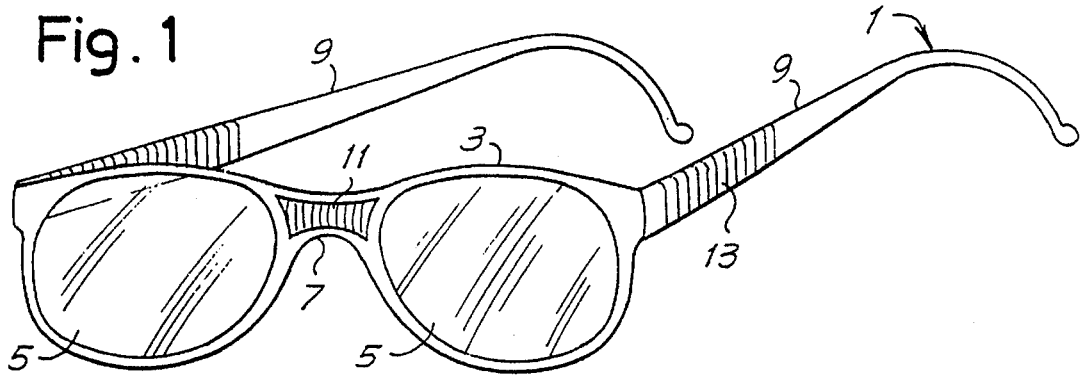
FIG. 1 shows a perspective view of a pair spectacles realized according to the invention.
Figure 2:
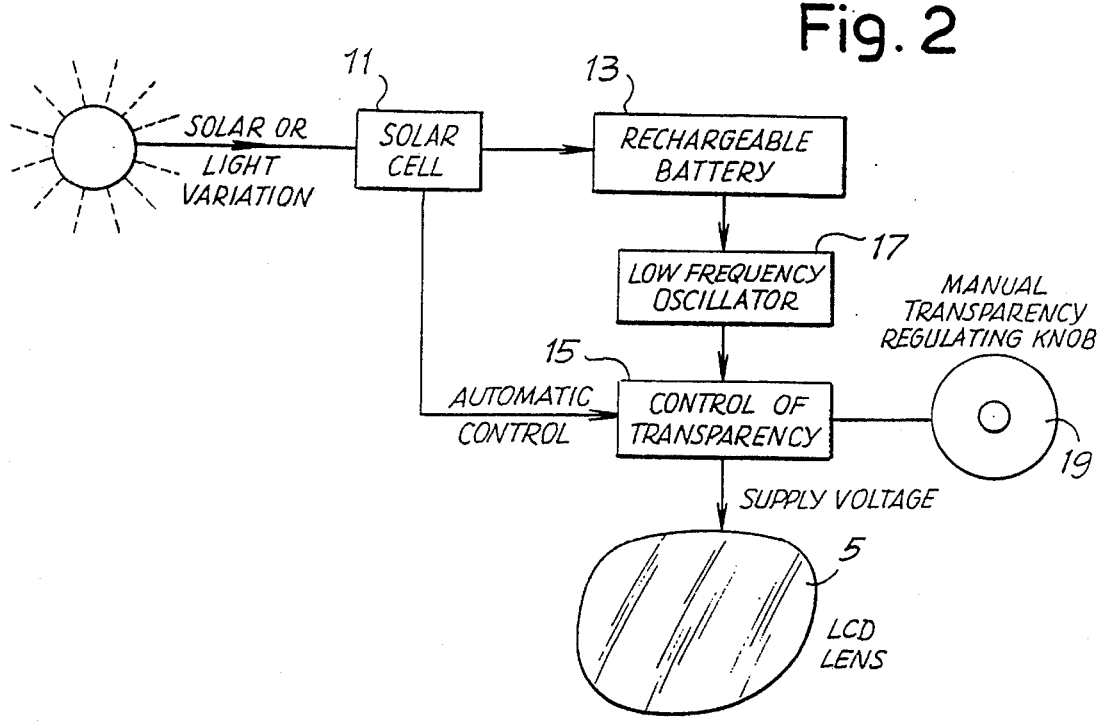
FIG. 2 shows a diagram of the electronic control system of the lenses of the spectacles of FIG. 1.

With initial reference to FIGS. 1 and 2, reference numeral 1 generally indicates a pair of spectacles comprising a frame 3 for two lenses 5 linked by a bridge 7. The frame is completed by arms 9. Each lens 5 is equipped or realized with a liquid crystal device (LCD) controlled by an electronic system illustrated in the form of a block diagram in FIG. 2. The electronic control system comprises a solar cell 11 or equivalent device, which is disposed on the bridge 7, between the lenses 5, in such a manner as to be irradiated with a luminous intensity substantially equal to that which irradiates the lenses 5. The solar cell 11 is connected to a rechargeable battery 13 accommodated in one of the two arms 9. Furthermore, the solar cell 11 is also connected to a control circuit 15 of a type known per se and not described in greater detail, which has the purpose of regulating the transparency of the liquid crystal device constituting the lens 5. The control circuit 15 is connected to a low frequency oscillator 17 powered by the rechargeable battery 13. Reference numeral 19 diagrammatically indicates a knob for the manual regulation of the transparency, which permits the variation of the transparency of the lens 5 independently of the irradiation conditions found by the solar cell 11.

Instead of a solar cell, it is possible to use a photoresistor system. The photoresistor (of value variable with the luminous intensity received) is in series with the voltage generator. The effect which is obtained is equivalent to that obtainable with the solar cell. In the text which follows, reference will always be made to solar cells, but it is understood that these can always be replaced by equivalent devices in the present context.

When the device is in operation, the transparency of each lens 5 is controlled by means of the voltage generated by the solar cell 11 and is thus a direct function of the irradiation condition. The adaptation of the transparency of each lens 5 to the irradiation conditions is immediate, because reducing or increasing the luminous power incident on the solar cell 11 the voltage generated by said cell immediately varies the voltage generated by said cell in corresponding fashion and thus the control circuit 15 can promptly vary the conditions of transparency of the lens 5.

In the configuration described up to this point, with reference to FIGS. 1 and 2, the transparency of each lens 5 is the same over the entire surface. The concept described above can however be improved in order to realize shaded lenses, in which the transparency is once again a function of the radiation conditions.

Figure 3:
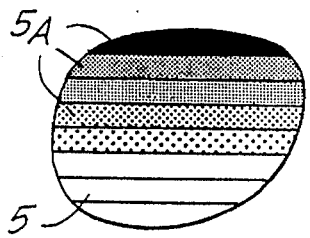
FIG. 3 shows a lens subdivided into a plurality of pixels or fields of variable transparency.
Figure 4:
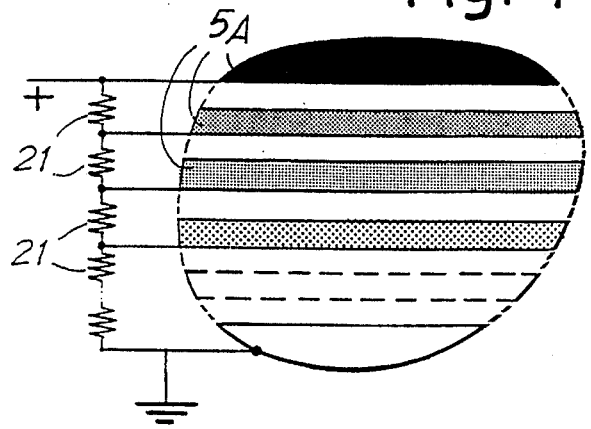
FIG. 4 shows a diagram of the electrical connection of the pixels of the lens of FIG. 3.

FIGS. 3, 4 and 5 diagrammatically show a realization of this type. FIG. 3 shows a lens 5 subdivided into a plurality of fields 5A, each defined by a strip which is substantially rectilinear and of horizontal extent. Each strip is constituted by an independent liquid crystal device, that is to say one that is driveable by its own voltage different from the control voltage of the adjacent strips. FIG. 4 shows a simplified electrical diagram of connection in series of the strips or pixels 5A with the interposition of resistive elements 21. In this way, each liquid crystal device 5A is powered by its own voltage. The voltage of each pixel is proportional to the supply voltage originating from the control circuit 15, but only the first pixel, the top one, receives the voltage directly originating from the control circuit, while the supply voltage of the individual subjacent pixels gradually decreases, so that the conditions of transparency of each pixel vary once again with the intensity of the irradiation, but the individual pixels will exhibit a degree of transparency decreasing from the top to the bottom, in a similar way to ordinary shaded lenses, with the difference, as compared with these, that the lens can also become fully transparent under conditions of low-level illumination.

FIG. 5 shows a further improvement in which there is provided a shading control circuit 23 at the input of which the supply voltage originating from the control circuit 15 is present and at the output of which there are present connections equal in number to the number of pixels or fields 5A into which the lens is subdivided. The shading control circuit 23 permits the regulation, by means of regulating means diagrammatically represented by the knob 25, of the percentage of shading of the individual pixels 5A. In this way, the lens can be shaded to a greater or lesser extent depending upon the wishes of the user.

While in FIGS. 3, 4 and 5 the fields or pixels into which the lens is subdivided are represented by substantially rectilinear strips, FIG. 6 shows a realization in which the lens, once again indicated by 5, is subdivided into a plurality of annular pixels or fields, with the exception of the central pixel, which is circular. Each pixel is constituted by an independent liquid crystal device, in a manner similar to what is described with reference to FIGS. 3, 4 and 5. The behavior of a lens exhibiting the configuration of FIG. 6 is similar to the behavior of a diaphragm or of a shutter of cine type. In this case, instead of providing a gradual shading from the periphery to the center of the lens, and instead of controlling each pixel in such a manner that its conditions of transparency vary gradually from a maximum to a minimum, it is possible to have each pixel assume either of only two conditions, i.e. a condition of maximum transparency or a condition of maximum darkness. In this way, the behavior of a diaphragm or of a shutter is simulated. FIG. 7 shows in (a), (b) and (c) the conditions of operation of the lens of FIG. 6 as the irradiation received by the solar cells controlling the lens varies. A device realized in this manner can serve, rather than for the realization of sunglasses, for application as diaphragm or shutter in cine systems.

FIG. 8 shows a diagram of a further improvement of a lens according to the present invention. FIG. 8 shows a portion 5B of a lens 5, subdivided into a plurality of pixels disposed in a matrix of m lines and n columns. The supply voltage at a control circuit 31 is proportional to the intensity of the irradiation on the solar cell 11. The control circuit manages the matrix of n×m pixels by means of n control wires for the lines and m control wires for the columns. With appropriate programming of the control circuit 31, it is possible to realize on the lens 5 shading distributions at will, notwithstanding the fact that, once the basic distribution of the shadings has been set up, the latter vary for each pixel in a manner proportional to the light intensity which reaches the solar cell of the device.

This configuration can also be used to realize corrective lenses, for example for myopia. A suitable (electronically controllable) distribution of the light and dark pixels can in fact serve to realize a black lens with a central aperture which operates as a corrective diaphragm.

FIG. 9 shows a block diagram of an embodiment in which there is provided an infrared ray sensor 51, a switching circuit 53 and a control circuit 55 for the lenses 5. The switching circuit 53 permits the slaving of the control circuit 55 alternately to the solar cell (not shown) or to the infrared ray sensor 51. The latter can receive an infrared signal originating from a television set (diagrammaticaly represented at 57) equipped with an infrared ray module 59. Television systems of this type are being designed for the realization of 3D transmissions. In these applications the images which follow one another on the screen are represented by an alternating succession of images taken by two television cameras placed side by side. The images taken by one television camera must be perceived by the left eye, while the images taken by the other television camera must be perceived by the right eye. The IR signal originating from the module 59 permits, by means of the sensor 51, the passing to the control circuit 55 of a switching signal which darkens the left or right lens 5 as a function of the type of image which is exhibited on the video. The alternating succession of these images on the screen with a synchronized variation of the conditions of the two lenses 5 in such a manner as to make them alternately transparent or dark permits three dimensional viewing.

In the description hereinabove reference has always been made to "lenses" realized with liquid crystal devices. However, it must be borne in mind that the same inventive concept can be applied to the realization of various optical instruments, such as for example filters. The term "lens" must therefore be understood, in the present context, in a broad sense, since it describes only an optical element (with surfaces which are plane parallel, curved and parallel, or even curved and not parallel, functioning as an actual lens) through which there passes the light radiation directed towards a receiving element, which may be represented by the eye or alternatively by a sensitive element (film or matrix of photosensors of a television camera or some other element) of an image recording device.

FIGS. 10 and 11 show a particularly advantageous embodiment of a lens for an optical instrument according to the invention. The lens, which can be (as illustrated and described earlier in the examples) a corrective lens as well, is realized with a pair of transparent meniscuses, of substantially the same shape and extent, which are coupled to one another. In FIG. 11 there is illustrated an enlarged local section in which it is possible to see the front and rear meniscuses, which are indicated by 5X and 5Y respectively. The two meniscuses can be of transparent glass, transparent plastic or some other material suitable for this type of optical applications. In the limiting case, they may be plane, but (as is usual in these applications) they preferably exhibit a curvature. The surfaces delimiting each meniscus may be parallel to one another, in which case the meniscus will not have a corrective effect. On the other hand, each meniscus 5X, 5Y may have non-parallel surfaces, in which case said meniscus will have a corrective property. The shape of the meniscuses may be any shape, selected and realized as a function of the specific requirements of each subject.

Between the two meniscuses there is defined a space 101, delimited by the surfaces 5X' and 5Y', facing one another, of the two meniscuses 5X and 5Y. The surfaces 5X' and 5Y' are coated with a layer of conductive transparent material, typically indium oxide or some other equivalent material of type known per se. The space 101 is filled with a liquid crystal, in contact with the conductive material of the coating of the surfaces 5X' ad 5Y'. The size of the space, and thus the distance between the two meniscuses 5X, 5Y, is maintained by means of the interposition of spacer microspheres 102. This technology is known per se for the realization of displays of large size and is not, accordingly, described in greater detail. Nevertheless, in the use proposed here this technique permits the achievement of effects which are entirely different and unforeseeable as compared with the conventional uses.

The space 101 is peripherally sealed by a plate 105 to contain the liquid crystal.

Using techniques known from the sector of liquid crystal displays, it is also possible in the present case to shape and incise the two transparent and conductive layers applied to the surfaces 5X' and 5Y' in such a manner as to obtain for example a subdivision into fields or into pixels of the space 101 in which there is situated the liquid crystal, i.e. the dichroic liquid which, electrically excited by the field generated by the conductive material of the layer applied to the walls 5X' and 5Y', becomes more or less transparent to light.

In the example illustrated, on the external surfaces 5X" and 5Y" of the two meniscuses 5X and 5Y there are placed two polarizing adhesive plastic films 107 and 109, to increase the contrast. These plastic films can be omitted or there can be provided a single film on one of the two faces.

In this embodiment, as in the preceding ones, the device is controlled in such a manner that in the absence of electrical power the lens is completely transparent, while in the presence of electrical power the degree of transparency diminishes as the voltage increases. This permits a functioning in safety, which avoids accidental darkenings (which may lead to very serious disadvantages) in the event of malfunction of the device.

FIGS. 12 and 13 show an improvement of the instrument of FIGS. 10 and 11. In this case, the lens 5 is once again constituted by two meniscuses 5X and 5Y which are coupled to one another, between which the dichroic liquid can be interposed, as described above. The meniscus 5X has a greater area and on its surface 5X", in the part not covered by the meniscus 5Y, there is realized a photovoltaic generator, for example by means of deposition of a layer of amorphous silicon 110. The latter, exposed to the solar irradiation, generates a voltage which can be directly used for the powering of the control chip of the liquid crystal or liquid crystals disposed between the two meniscuses 5X and 5Y or for the recharging of the battery. The zone with the layer of amorphous silicon 110 is positioned, in the example illustrated, on the upper portion of the frame, in such a manner as not to interfere with the field of view.

It is understood that the drawing shows only an exemplification given only as a practical demonstration of the invention. In particular, it is possible to dispense with the automatic control of the transparency, replacing the photosensitive means by manual regulating means. The two regulating systems—manual or automatic—can coexist and function in alternation.

We claim:
1. Eyeglasses, comprising:
   a frame;
   a pair of lenses mounted on said frame, said lenses including a liquid crystal device having a variable transparency;

voltage generator means applied on said lenses, said voltage generator means for converting luminous energy incident on said lenses into electrical energy, said voltage generator means including a film deposited on a portion of a surface of said lenses, said voltage generator including control output means connected to said liquid crystal device of said lenses for controlling said transparency of the lenses as a function of said incident luminous energy.

2. Eyeglasses according to claim 1, wherein said lenses are lenses for correcting vision.

3. Eyeglasses according to claim 1, wherein said lenses each include a front transparent meniscus and a rear transparent meniscus which are coupled to one another and between which said liquid crystal device is disposed.

4. Eyeglasses according to claim 3, wherein between said front meniscus and said rear meniscus there are further disposed spacer microspheres which maintain a uniform distance between two opposing surfaces of said front meniscus and said rear meniscus.

5. Eyeglasses according to claim 3, wherein said front meniscus and said rear meniscus have external surfaces, a polarizing adhesive plastic film being disposed on at least one of said external surfaces.

6. Eyeglasses according to claim 1, further comprising manual control means connected to said liquid crystal device for manual regulation of the transparency of said lenses.

7. Eyeglasses according to claim 2, further comprising:

an infrared sensor for detecting an IR signal;

switching means for connecting said liquid crystal device of said lenses alternatively to said infrared sensor and to said voltage generator, whereby each lens, upon connection to said infrared sensor assumes a condition of transparency or of darkness alternatively, in response to the infrared signal detected by said sensor, and each lens, upon connection to said voltage generator is controlled by a voltage signal generated by said voltage generator as a function of the incident luminous energy.

8. Eyeglasses according to claim 1, wherein said lenses are subdivided into a plurality of adjacent fields, each field having the form of a strip extending along a width of the relevant lens, each field being constituted by a pixel realized with one said liquid crystal device, said pixels being connected to one another and being connected to said voltage generator in such a manner that each pixel is supplied with a different voltage as compared with adjacent pixels in order to obtain a gradual shading of said lenses.

9. Eyeglasses according to claim 8, wherein said gradual shading is from the top to the bottom of the lenses.

10. Eyeglasses, comprising:

a frame;

a pair of lenses mounted on said frame, said lenses including a liquid crystal device having a variable transparency;

voltage generator means connected to said lenses, said voltage generator means for converting luminous energy incident on said lenses into electrical energy;

an infrared sensor for detecting an IR signal;

switching means which connects said liquid crystal device of said lenses alternatively to said infrared sensor and to said voltage generator, whereby each lens, upon connection to said infrared sensor assumes a condition of transparency or of darkness alternatively, in response to the infrared signal detected by said sensor, and each lens, upon connection to said voltage generator is controlled by a voltage signal generated by said voltage generator as a function of the incident luminous energy.

11. Eyeglasses, comprising:

a frame;

a pair of lenses mounted on said frame, said lenses including a liquid crystal device having a variable transparency;

voltage generator means connected to said lenses, said voltage generator means for converting luminous energy incident on said lenses into electrical energy, said lenses being subdivided into a plurality of adjacent fields, each field having the form of a strip extending along a width of the relevant lens, each field being constituted by a pixel realized with a liquid crystal device, said pixels being connected to one another and being connected to said voltage generator in such a manner that each pixel is supplied with a different voltage as compared with adjacent pixels in order to obtain a gradual shading of said lenses.

12. Eyeglasses according to claim 11, wherein said gradual shading is from the top to the bottom of the lenses.

13. Eyeglasses according to claim 11, wherein an amount of said gradual shading is manually adjustable.

14. Eyeglasses according to claim 12, wherein an amount of said gradual shading is manually adjustable.

15. Eyeglasses according to claim 11, wherein said gradual shading is from the top to the bottom of the lenses with pixels of each voltage level extending horizontally in a rectangular block to provide said strip.

* * * * *